US008662992B2

(12) United States Patent
Bibbey et al.

(10) Patent No.: US 8,662,992 B2
(45) Date of Patent: Mar. 4, 2014

(54) JURISDICTIONAL CONTROL IN A WAGERING GAME SYSTEM PLUGIN ARCHITECTURE

(75) Inventors: Ryan L. Bibbey, Reno, NV (US); Rory L. Block, Washoe Valley, NV (US); Robert T. Davis, Reno, NV (US); Edward Q. Earley, Chicago, IL (US); Remy Y. Goglio, Reno, NV (US); Jacek A. Grabiec, Chicago, IL (US); Robert L. McSulla, Hoffman Estates, IL (US); Christopher A. Royce, Reno, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/597,038

(22) Filed: Aug. 28, 2012
(Under 37 CFR 1.47)

(65) Prior Publication Data

US 2013/0190080 A1 Jul. 25, 2013

Related U.S. Application Data

(60) Provisional application No. 61/528,312, filed on Aug. 29, 2011.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......... 463/20; 463/42

(58) Field of Classification Search
USPC .......... 463/20, 42
See application file for complete search history.

(56) References Cited

FOREIGN PATENT DOCUMENTS

WO WO20081568009 * 12/2008 .......... A63F 9/24

* cited by examiner

*Primary Examiner* — William M. Brewster
(74) *Attorney, Agent, or Firm* — DeLizio Gilliam, PLLC

(57) ABSTRACT

A wagering game system and operations for a wagering game system include a plugin architecture and framework in which wagering game system applications utilize plugins to provide functionality for an application or service. The plugins may be independently tested and verified by a jurisdictional testing agent to confirm that the operation of the plugin complies with the rules and regulations for a jurisdiction. If plugins are added or updated, a system vendor may submit only those plugins that require jurisdictional approval to a testing agent. An application or service may download plugins that are approved for use in the jurisdiction in which the application or service is operating.

25 Claims, 10 Drawing Sheets

JURISDICTIONAL CONTROL IN A WAGERING GAME SYSTEM PLUGIN ARCHITECTURE

RELATED APPLICATIONS

This application claims the priority benefit of U.S. Provisional Application Ser. No. 61/528,312 filed Aug. 29, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems including a plugin architecture.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

As wagering games and wagering game systems have evolved, they have grown more complex and include much more software and content than in previous systems. While the growth in content and complexity bring about more exciting games and aid in the management of wagering game systems, the growth in content and complexity makes it harder to obtain regulatory approval because the approving body must typically analyze each application in its entirety before granting approval for the application in a particular jurisdiction.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. In general, the embodiments of the invention include a plugin architecture and framework in which wagering game system applications utilize plugins to provide much of the functionality for an application. The plugins supply logically independent pieces of functionality for the application. Each of the plugins may be independently tested and verified by a jurisdictional testing agent to confirm that the operation of the plugin complies with the rules and regulations for a jurisdiction. This can decrease the burden on the jurisdictional testing agent because there is typically only a small portion of an application that needs to be tested when an application is modified. The decrease in burden on the jurisdictional testing agent can provide for quicker approval of the plugin (and thus its associated application) resulting in a benefit to both the jurisdictional testing agent and the application provider. Additionally, the use of plugins facilitates addition, extension and change to applications without requiring system wide re-compilation. This aids the developer in quicker development of features and applications that are easier to maintain.

Figure 1:
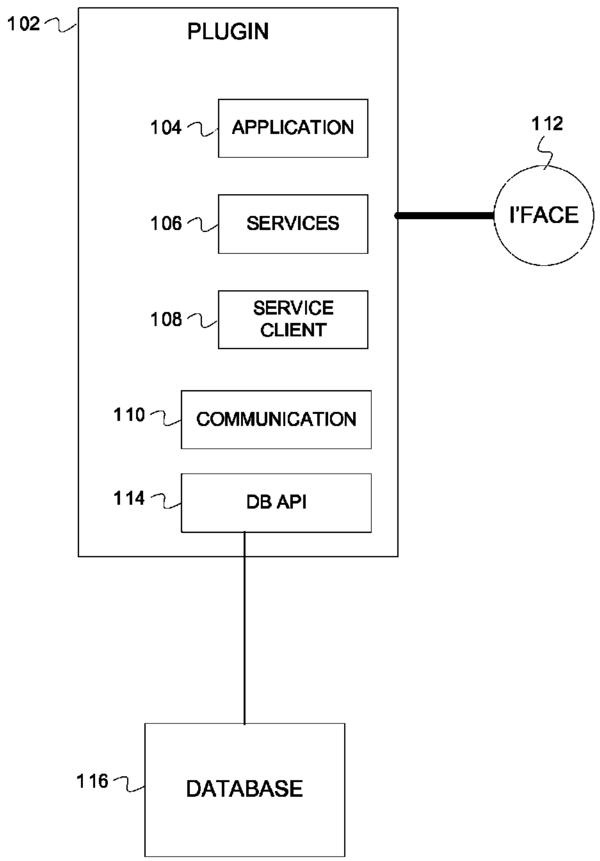
FIG. 1 is a block diagram of a plugin according to embodiments.

FIG. 1 is a block diagram of a plugin 102. In some embodiments, a plugin is a software component that can be loaded during the run-time of an application (i.e., dynamically loaded) such that the plugin becomes part of the running application. A plugin is typically designed to provide functionality that is logically independent and isolated from the functionality provided by other plugins. For example, a plugin that provides authorization functions is separate from plugins that provide database access functions, download functions etc. It is desirable that the plugin is logically and functionally separate from other plugins and further that the plugin has enough information to work relatively independently when loaded in a host application. In some embodiments, plugin 102 may include one or more of plugin application 104, plugin service 106, service client 108, and communication module 110. Plugin application 104 comprises software that performs application functionality provided by the plugin. For example, plugin application 104 for a bonus game would contain the algorithms performed by the plugin to implement and present the bonus game. In some embodiments, plugin application 104 is configured as a Microsoft Silverlight application.

Plugin service 106 comprises a service that is provided by the plugin. As an example, a plugin may provide an authorization service for a host application. Plugin service 106 in this example would implement the algorithms of the authorization service.

Service client 108, in some embodiments, is a placeholder for code that is automatically generated based on a service metadata defining a service that is used by plugin 102. Service client 108 can be used to invoke the service. In some embodiments, service client 108 is a WCF (Windows Communication Foundation) service client.

Plugin communication unit 110 comprises an API that provides for plugin-to-plugin communications. In some embodiments, plugin communication unit 110 provides message based communications.

In some embodiments, a plugin 102 communicates with a database 116 through database API (Application Programming Interface) 114. A plugin may be associated with a database domain. A domain represents a database or view into data maintained by a database. Domains may be shared across plugins that use the same database or view. Domain validation rules or other code that is common across plugins sharing the domain may be implemented in shared code. In some embodiments, code sharing is implemented using linked files in Visual Studio. In alternative embodiments, code sharing may be provided by WCF-RIA links.

Plugin 102 also includes interface 112. Interface 112 identifies the methods, data and messages that are exposed by the plugin for use by host applications to invoke the plugin applications 104 and plugin services 106 provided by plugin 102. Such methods and data may be referred to as exports of the plugin. Further, interface 112 identifies the methods, data and messages that the plugin expects to use from sources outside of the plugin. Such methods and data may be referred to as imports of the plugin. Interface 112 defines a contract according to which exports and imports interface with host applications or other plugins.

In some embodiments, plugin 102 comprises a dynamically loadable object such as a Dynamic Link Library (DLL), shared object (".so" file) or other object that can be loaded during the runtime of an application. In further embodiments, plugin 102 may be provided as a ".xap" file. A ".xap" file is a Microsoft Silverlight compressed file that contains the object code and other files necessary for the operation of the plugin.

Figure 2:
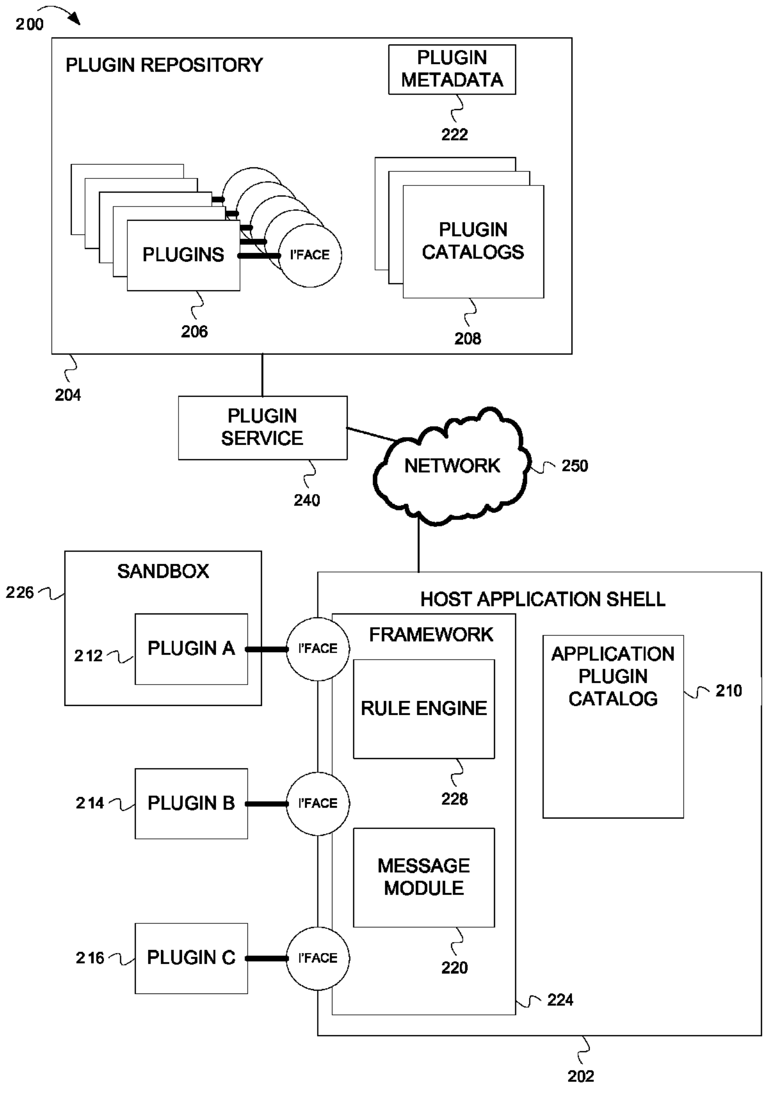
FIG. 2 is a block diagram of a plugin architecture according to embodiments.

FIG. 2 is a block diagram of a plugin architecture 200. In some embodiments, plugin architecture 200 includes a host application shell 202, a plugin repository 204 and a plugin service 240. Elements in the architecture such as application 202 and plugin service 240 may be communicably coupled by a network 250. Network 250 may be a private network such as a network within a casino or network that connects casinos, or it may be a public network such as the Internet.

Plugin repository 204 is a repository containing plugins 206, plugin catalogs 208 and plugin metadata 222. Plugin repository 204 is a storage area for plugins that are available for download and instantiation by host applications or other plugins. The storage area may be a file system, a database, or other entity capable of locating and storing data, or a combination of such storage entities.

Plugin repository 204 maintains a set of one or more plugin catalogs 208. A plugin catalog provides data regarding one or more plugins that may be grouped together as part of a host application. Such data includes the methods, data and messages exported or imported by the plugin and dependency information for the plugin (i.e., specific data identifying a plugin or other component that the plugin relies on for correct operation. A catalog also includes methods and data that the catalog uses to discover resources required by the plugin. These resources may be supplied by the host application 202, framework 224 or other plugins or components of wagering game system 200.

Plugin metadata 222 includes data about plugins 206. Various types of metadata may be maintained for a plugin. In some embodiments, plugin metadata 222 includes a version identifier for a plugin and a description of the plugin. Further, plugin metadata 222 may include data indicating whether or not jurisdictional approval is required for the plugin and a list of regulatory jurisdictions in which the plugin is currently approved for operation. Additionally, plugin metadata 222 may include data indicating a role or roles for a user that the user needs in order to utilize the plugin in a host application.

Although one repository is shown in FIG. 2, in some embodiments repository 204 may comprise multiple repositories, either on the same server or system or distributed across multiple servers or systems.

Plugin service 240 is a service that host applications use to retrieve catalogs, plugins and plugin metadata from repository 200. Plugin service 240 provides a uniform abstracted interface for retrieving catalogs and plugins that insulates applications from having to know details on the operation of repository 204.

Host application shell 202 is an application shell that hosts one or more plugins that together with the application shell form a complete application. Host application shell 202 includes initialization routines that download at least one application plugin catalog 210 from the plugin catalogs 208 maintained in plugin repository 204. Host application shell 202 then uses the discovery routines and classes in application plugin catalog 210 to locate and download the plugins defined for the application in application plugin catalog 210.

Host application shell 202 includes framework 224. Framework 224 includes code and data that is reused across multiple host application shells and provides functionality used to support dynamically loading plugins into host applications during the applications' runtime. Examples of such functionality include code to retrieve a catalog from a plugin repository, a message module 220 to provide communications capability for plugins to communicate with other plugins, and other low level support routines. Components of framework 224 may include one or more of extendable base classes, contracts, messages, service clients, object factories, etc. In some embodiments, framework 224 itself may be a plugin or include plugins to allow for addition, extension and change of its composite parts.

Message module 220 comprises a message passing infrastructure that enables messages to be communicated between plugins and between host applications and plugins. In some embodiments, message module 220 implements a publish and subscribe message passing infrastructure. Applications or plugins publish messages having message types. Plugins or applications subscribe to the types of messages they want to receive. Any plugin or application that has subscribed to a particular message type receives messages having the subscribed to type. Plugins or host applications either do not receive or ignore messages that do not have a type that the application or plugin has subscribed to. Message module 220 may also provide schemas for messages so that plugins and applications can properly interpret payloads in messages that are published through the message module 220. In some embodiments, the message schemas may be versioned such that payloads and other message components for the messages are versioned. Payload versioning can be used to provide a backwards compatible messaging system. For example, a payload may have multiple versions where newer versions of the payload are inclusive of previous versions. Thus plugins that support a new version of a message can coexist with plugins that interpret the message payload using an older version of the message schema.

In some embodiments, framework 224 includes a rules engine 228. Rules engine 228 interprets rules at runtime that can change the behavior of a host application without recompiling components of the host application. A user may specify configuration rules that determine the plugins that are loaded when a host application is instantiated. Further rules may be used to specify events, conditions or schedules that cause plugins to be loaded or replaced as will be further described below.

In some embodiments, plugins and catalogs in repository 204 and portions of framework 224 include components from Prism. Additional details on Prism are available from the URL "compositewpf.codeplex.com." Further, plugins and catalogs in repository 204 and portions of framework 224 may include components from .NET, Silverlight, WPF (Windows Presentation Foundation), WCF RIA (Windows Communication Foundation Rich Internet Applications) and MEF (Managed Extensibility Framework) available from Microsoft Corporation.

In the example illustrated in FIG. 2, host application shell 202 has downloaded application plugin catalog 210, which resulted in the discovery of three plugins, plugin A 212, plugin B 214 and plugin C 216 for host application shell 202. The plugins were downloaded and instantiated into host application shell 202. Plugins A, B and C provide different services or application functionality to host application shell 202.

In some embodiments, a plugin may run in the context of a sandbox 226. In the example illustrated, plugin A 212 runs within sandbox 226. Sandbox 226 provides an execution environment in which resources such as memory, network and device resources made available to a plugin are controlled and managed by the sandbox. This allows the plugin to be isolated from the rest of the system in order to provide stability and security to the system.

Figure 3:
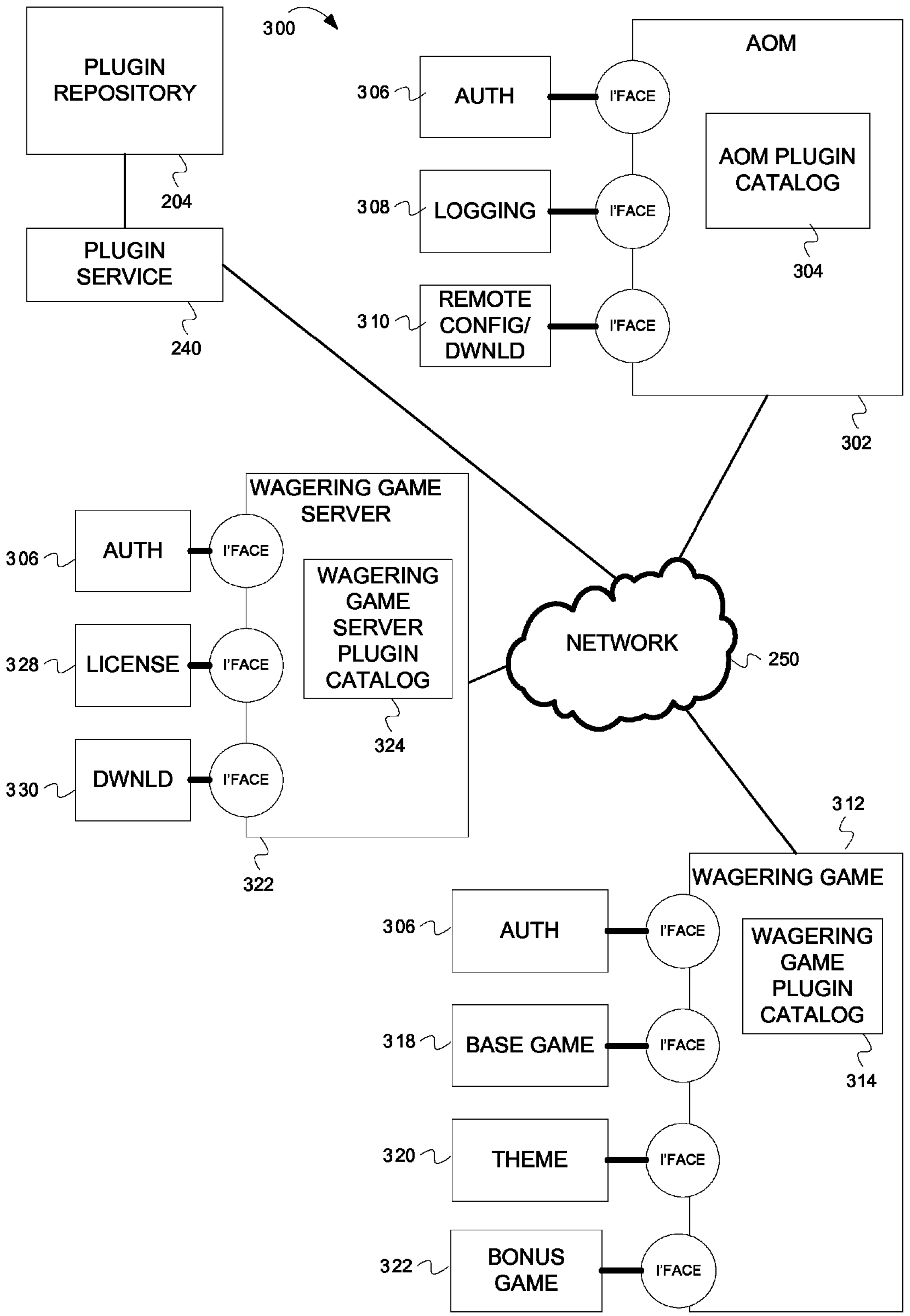
FIG. 3 is a block diagram illustrating an example wagering game system using a plugin architecture.

FIG. 3 is a block diagram illustrating an example wagering game system 300 using a plugin architecture. In the example shown, wagering game system 300 includes plugin service 240, AOM (Administration, Operations and Maintenance) application 302, wagering game machine 312 and wagering game server 322, all communicably coupled to network 250. AOM 302 provides functions that control, manage and report on operational aspects of wagering game system 300. For example, AOM 302 may download and configure wagering games on wagering game machines in system 300. Portions of the functionality supported by AOM 302 may be provided by plugins such as authorization plugin 306, logging plugin 308 and RCD (Remote Configuration and Download) plugin 310. The set of plugins used by AOM 302 may be specified by AOM plugin catalog 304, which is retrieved when AOM 302 is instantiated.

Authorization plugin 306 provides user authorization functions to determine the level of authorization (if any) possessed by a user logging into AOM 306. In some embodiments, authorization plugin 306 determines a role for a user. Examples of roles include casino operator, marketing operator, administrator, player etc. Each role may have a different set of authorizations regarding the plugins that are available to a user having the role. As an example, a marketing operator may be able to use plugins in AOM 302 that provide reporting of various marketing related data collected by an AOM, however a marketing operator may not have access to a configuration plugin that may be used to configure wagering game machines on a casino floor. Similarly, a user having casino operator role may be allowed to use a plugin that configures wagering game machines on a casino floor, but may not have access to plugins that that control licensing restrictions for the games.

Logging plugin 308 provides logging of data and events that occur within wagering game system 300. Such logging may include logging based on regulatory requirements for a jurisdiction.

Remote configuration and download plugin 310 may provide an interface for an AOM 302 user to configure wagering games on wagering game machines and to cause wagering games and other components to be downloaded from a wagering game server 322 to a wagering game machine 312.

Like AOM 302, wagering game machine 312 may utilize plugins to provide wagering games. In some embodiments, wagering game machine 312 includes authorization plugin 306, base wagering game 318, theme 320 and bonus game 322. Authorization plugin 306, as described above, is used to determine a role for a user of wagering game machine 312.

Base wagering game plugin 318 provides a base or main wagering game for wagering game machine 312. The base wagering game implemented by plugin 318 may be any type of computerized wagering game such as slots, blackjack, keno, poker, roulette, etc.

Theme plugin 320 provides an interface that controls a theme for a wagering game machine 312. For example, a wagering game machine may have a board game theme (e.g., Monopoly), a fishing theme, a movie theme (e.g., Wizard of Oz) etc. Theme plugin 320 provides an interface that may be used to provide theme elements for reels, skins and other components of a wagering game.

Bonus game plugin 322 provides a bonus game for a wagering game machine 312. In some embodiments, certain events may trigger the execution of a bonus game provided by plugin 322. Such events may include the appearance of a particular symbol or set of symbols on the reels of a slots based game, or a randomly occurring "mystery" event. Bonus game plugin 322 provides the player with the opportunity to earn additional credits, credit multipliers, game achievements, badges or community gaming experience. After the bonus game executes, the base wagering game provided by base wagering game plugin 318 resumes.

Wagering game server 322, like AOM 302 and wagering game machine 312 may also utilize a plugin architecture. In the example illustrated in FIG. 3, Wagering game server 322 includes authorization plugin 306, license plugin 328 and download plugin 330. Authorization plugin 306, as described above, is used to determine a role for a user of wagering game server 322.

Download plugin 330 provides a download interface to download wagering game content and other content to machines such as wagering game machine 312. Download plugin 330 may implement one or more protocols used to communicate between wagering game server 322 and the target of the download. Content downloaded by download plugin 330 to a target machine may be sourced on the wagering game server or it may be sourced on plugin repository 204.

License plugin 328 provides licensing information. License plugin 328 may be used to determine if particular wagering game content can be downloaded to a wagering game machine 312 according to the terms of a license agreement between the wagering game content provider and the operator of a wagering game machine.

In some embodiments, plugins are designated as core plugins and application plugins. Core plugins are instantiated in a host application regardless of the role of a user of the application. Examples of such core plugins include authentication plugins, logging plugins and menu management plugins. Core plugins may be instantiated into a host application shell prior to determining a role of a user of the application.

Application plugins are plugins that are instantiated into a host application shell after user authentication has determined a role for a user of the application. Examples of such plugins include configuration plugins, reporting plugins, status viewing plugins etc.

The plugins illustrated above for AOM 302, wagering game machine 312 and wagering game server 322 are merely examples of possible plugins. Those of skill in the art having the benefit of the disclosure will appreciate that many other plugins may be used by any of AOM 302, wagering game machine 312 or wagering game server 322 in addition to or instead of those illustrated in the example provided in FIG. 3. Examples of such plugins are provided below.

Figure 4:
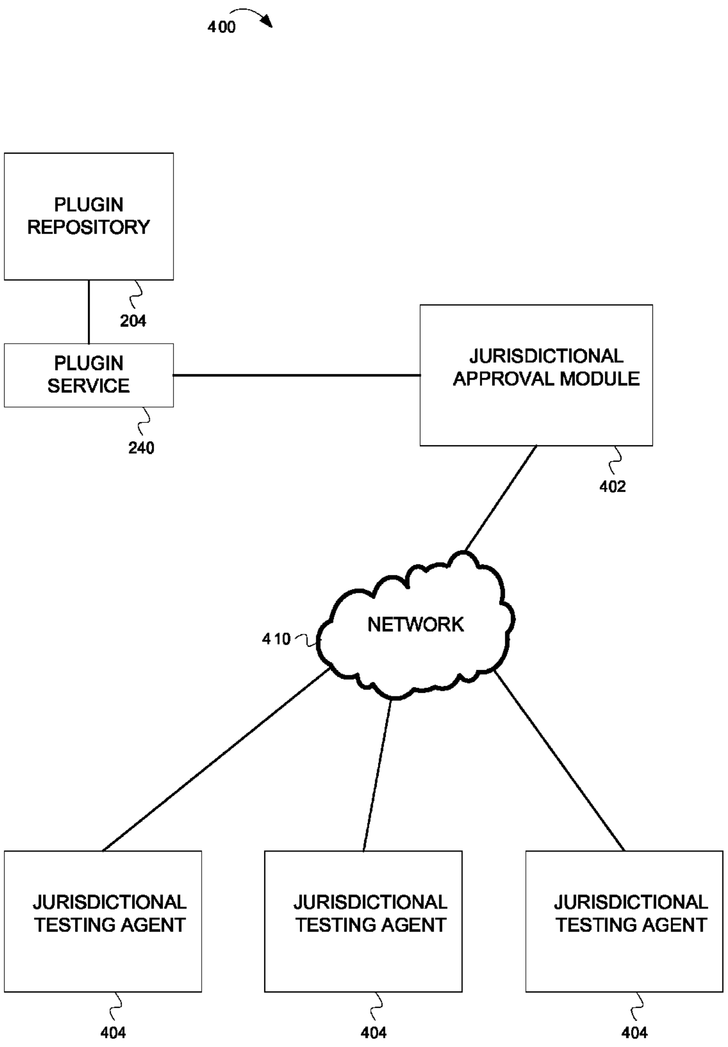
FIG. 4 is a block diagram of a jurisdictional approval system.

FIG. 4 is a block diagram of a jurisdictional approval system 400 according to embodiments. In some embodiments, system 400 includes a jurisdictional approval module 402, plugin service 240 and one or more jurisdictional testing agents 404. Jurisdictional approval module 402 may be communicably coupled to a jurisdictional testing agent through network 410. Network 410 may be a public network such as the Internet or a private network.

Jurisdictional testing agent 404 is an entity that tests hardware and software submitted by wagering game system vendors for compliance with regulations for a jurisdiction. Jurisdictional testing agent 404 may be a governmental regulatory agency or other governmental entity that tests submitted hardware or software. Alternatively, jurisdictional testing agent 404 may be a private testing company working under contract with a governmental regulatory entity that tests submitted hardware or software. A private testing company may work with multiple jurisdictions.

Jurisdictional approval module 402 comprises software that manages an approval process for wagering game system applications that may require regulatory approval. In some embodiments, jurisdictional approval module 402 identifies applications requiring jurisdictional approval and further identifies plugins used by an application that have yet to be approved in a jurisdiction. In some embodiments, jurisdictional approval module 402 provides a user interface allowing a user to specify a desired application and jurisdiction. Jurisdictional approval module 402 may be a standalone software module. Alternatively, jurisdictional approval module 402 may itself be a plugin, for example, a plugin that is instantiated by AOM 302 (FIG. 3).

Although FIGS. 1-4 describes some embodiments, the following sections describe many other features and embodiments.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
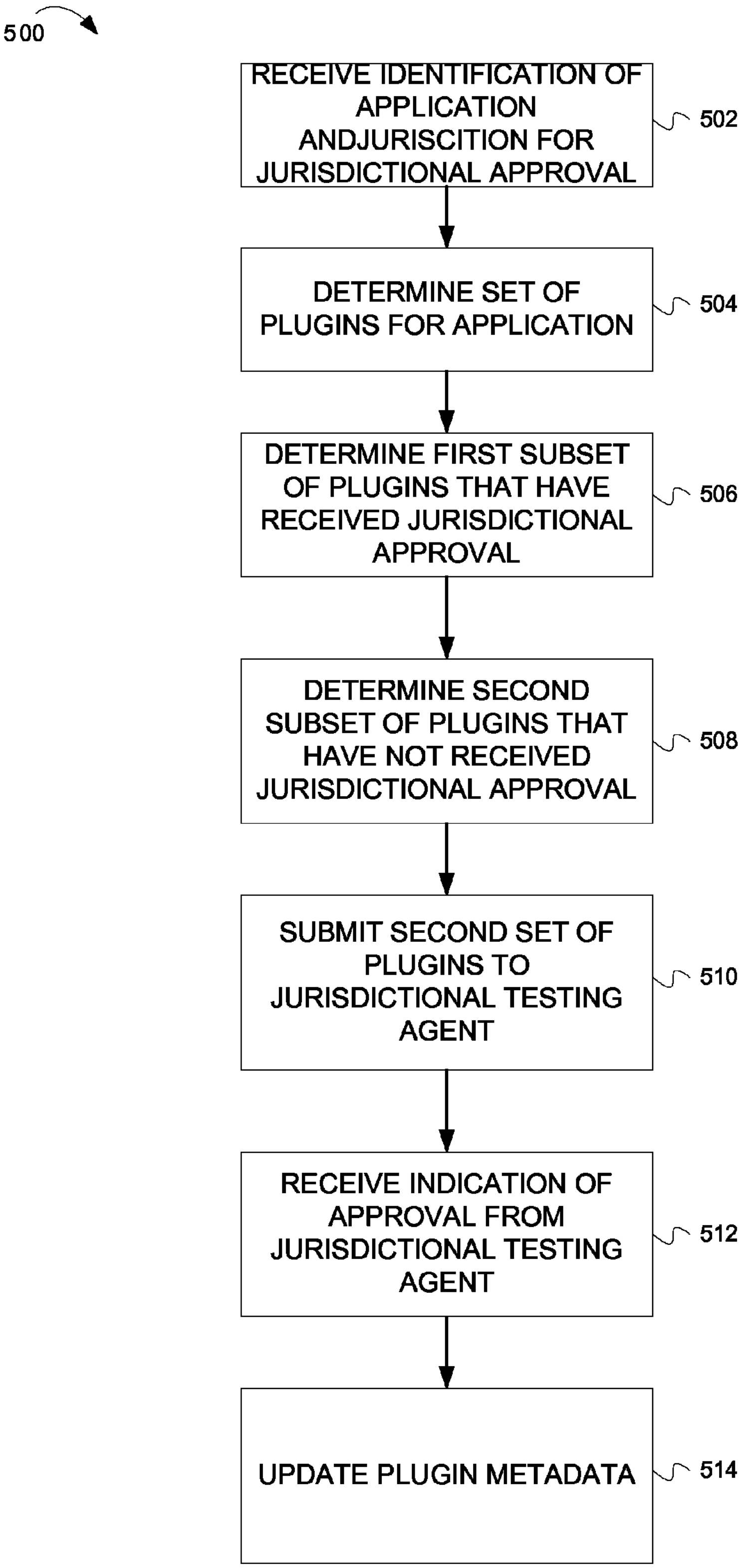
FIG. 5 is a flowchart illustrating a method for obtaining jurisdictional approval for an application.
Figure 6:
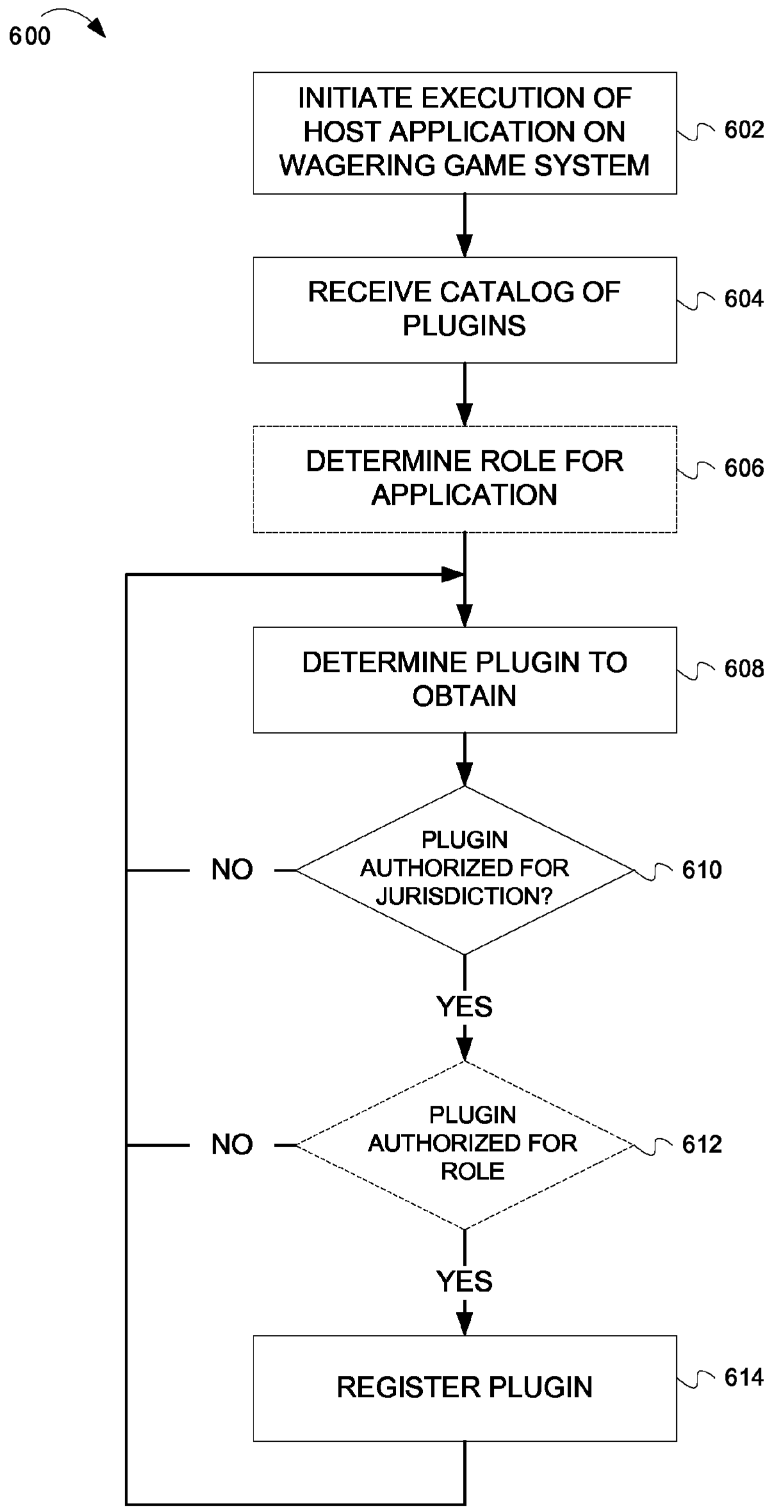
FIG. 6 is a flowchart illustrating a method for executing an application that includes one or more plugins.
Figure 7:
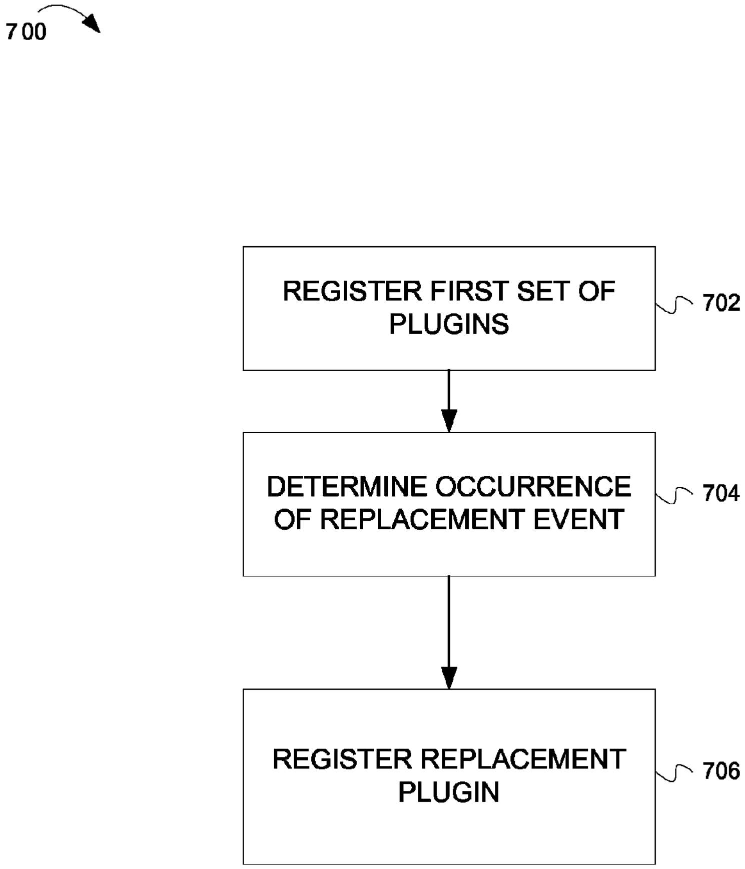
FIG. 7 is a flowchart illustrating a method for replacing a plugin in a host application.

The section will discuss FIGS. 5-7. The discussion of FIG. 5 will describe operations for obtaining jurisdictional approval for a host application having plugins. The discussion of FIG. 6 will describe operations for initiating a host application having plugins. The discussion of FIG. 7 will describe operations for replacing a plugin for a host application.

FIG. 5 is a flowchart illustrating a method 500 for obtaining jurisdictional approval for an application. In some embodiments, the method begins at block 502 with a jurisdictional approval module 402 receiving an identification of an application for which jurisdictional approval is desired, and a jurisdiction in which approval is desired. The identification may be the result of a selection from a user interface, or it may be automatically determined based on updates to one or more components of the application (e.g., updates to plugins that may be part of the application). Updates to a component that is shared by multiple applications may cause each of the multiple applications to be identified as an application for which jurisdictional approval may be desired.

At block 504, jurisdictional approval module 402 determines a set of plugins associated with the application. In some embodiments, jurisdictional approval module 402 reads one or more catalogs associated with an application to determine a set of plugins associated with the application. As discussed above, the catalogs include information on the plugins used by an application, and further contain dependency information for plugins. The system reads this information to determine the set of plugins potentially used by an application.

At block 506, jurisdictional approval module 402 determines a set of jurisdictionally approved plugins, where a jurisdictionally approved plugin is a plugin that requires approval in the identified jurisdiction and that has already been approved for use within the identified jurisdiction. As discussed above, plugin metadata 222 (FIG. 2) maintains data about plugins in a plugin repository, including data regarding jurisdictions where the plugins have been approved for operation. In some embodiments, jurisdictional approval module 402 can use this data to determine which plugins for the identified application have been already approved for use in the identified jurisdiction.

At block 508, jurisdictional approval module 402 determines a set of jurisdictionally non-approved plugins. A jurisdictionally non-approved plugin is a plugin that requires jurisdictional approval in order to operate in a jurisdiction and that has yet to receive jurisdictional approval for the jurisdiction. In some embodiments, jurisdictional approval module may use plugin metadata 222 to determine that a plugin used by the identified application has not yet been approved in the identified jurisdiction.

At block 510, the jurisdictional approval module 402 submits the set of jurisdictionally non-approved plugins to a jurisdictional testing agent responsible for the jurisdiction identified at block 502. The jurisdictional approval module may automatically determine the jurisdictional testing agent associated with the identified jurisdiction. In some embodiments, the set of non-jurisdictionally approved plugins may be electronically transmitted to the jurisdictional testing agent over a network coupling the jurisdictional approval module 402 and the jurisdictional testing agent. In alternative embodiments, the set of jurisdictionally non-approved plugins may be submitted to the jurisdictional testing agent on one or more computer-readable media such as CD-ROM, DVD-ROM, flash memory, or other types of computer-readable media now known or developed in the future. In addition to the plugins, source code for the plugins and a change log of changes from a previous version of the plugin may be supplied to the jurisdictional testing agent.

In some embodiments, the jurisdictional testing agent maintains a set of applications and plugins that have been previously approved. Upon receiving the set of non-jurisdictionally approved plugins, the testing agent combines the set of non-jurisdictionally approved plugins with the previously approved application and plugins to perform testing on the set of non-jurisdictionally approved plugins.

In alternative embodiments, the jurisdictional approval module 402 submits a host application and both jurisdictionally approved plugins and non-jurisdictionally approved plugins. In addition, the jurisdictional approval module sends a list indicating which plugins are non-jurisdictionally approved plugins. The testing agent can then use the list to determine which plugins to test and which plugins do not require testing.

At block 512, the jurisdictional approval module 402 receives an indication from the jurisdictional testing agent regarding whether or not the plugins submitted for testing are approved for the indicated jurisdiction. In some embodiments, the indication may be received electronically over a network. In alternative embodiments, the indication may be received via one or more computer-readable media. In further embodiments, a paper based indication may be received and the results used to update plugin metadata via a user interface.

At block 514, the plugin metadata for the plugins submitted for testing is updated to indicate the results of the testing.

As can be seen from the method above, various embodiments provide the ability for a jurisdictional testing agent to focus testing efforts on plugin components of an application rather the testing an entire application. The ability to confidently test independent plugin components rather than an entire application can reduce the time required to approve an application because only smaller portions of the application (i.e., the non-approved plugins) need to be tested. This leads to quicker turnaround times for obtaining jurisdictional approval of an application. This in turn can lead to improved time to market for updated applications.

FIG. 6 is a flowchart illustrating a method 600 for executing an application that includes one or more plugins. The method starts at block 602 where execution of a host application is initiated. The host application may be initiated in response to invoking the host application by a user through a command line or graphical user interface. Alternatively, the host application may be automatically initiated, for example as a scheduled application or through a configuration file.

At block 604, the host application receives a catalog of plugins for the application. In some embodiments, the host application contacts a plugin service to obtain the catalog. In alternative embodiments, the catalog may be received from a disk file or other persistent storage. As discussed above, the catalog defines a set of one or more plugins that may be used by an application. In some embodiments, a host application may query a plugin service to determine if a plugin exists that provides a desired interface.

At block 606, some embodiments optionally determine a role for the host application. The role may be determined in various ways. For example, in some embodiments, a role may be determined by prompting an application user to log in. The user may log in by entering a user identification and password, or using a device such as a player tracking card that provides a user identification. The role associated with the user identification is the role for the host application. In alternative embodiments, the role may be determined by using the same role as that assigned to a user or system that initiated execution of the application.

At block 608, the host application determines a plugin to obtain. In some embodiments, the host application determines plugins to obtain from the catalog downloaded at block 604. The host application may attempt to obtain the plugin from a plugin service. Alternatively, the host application may obtain the plugin directly from a repository or from a file system accessible to the machine that is running the host application.

At decision block 610, the system determines if the plugin is authorized for the jurisdiction where the host application is executing. In some embodiments, the system consults plugin metadata 222 (FIG. 2) to determine if the plugin is authorized for the jurisdiction. Various components in the system may determine whether or not the plugin is authorized for the jurisdiction. For example, in some embodiments, plugin service 240 (FIG. 2) may make the determination when a request is made to download a plugin. The plugin service may receive the jurisdiction from the host application in cases where the plugin service serves plugins to host applications that may execute in different jurisdictions. If the plugin is authorized for the jurisdiction, then the plugin service may proceed to download the plugin to the host application. Alternatively, if the plugin is not authorized, then the plugin service may refuse to download the plugin to the host application.

In alternative embodiments, the host application (or a framework 224 within the host application) may determine whether or not the plugin is authorized for the jurisdiction prior to requesting a download of the plugin. For example, the host application or framework may obtain plugin metadata for the plugin indicating whether the plugin is authorized for the jurisdiction or not. If the plugin is authorized, then the host application proceeds to request a download of the plugin.

If the check at block 610 determines that the plugin is not authorized for the jurisdiction, then in some embodiments, the system returns to block 608 to obtain the next plugin, if any, from the catalog. In some embodiments, the system may provide a log entry or provide a display to a user indicating that the plugin is not authorized for the jurisdiction. In alternative embodiments, the system may determine if an alternative plugin is available that is jurisdictionally approved and provides the same interface and functionality. For example, a previous version of a plugin that is jurisdictionally approved may be available.

In some embodiments, at decision block 612 the system optionally determines if the plugin is authorized for the role associated with the host application. Like the check at block 610, the system may consult plugin metadata to determine roles that are authorized to use the desired plugin and to compare the current role to the authorized role or roles. In some embodiments, if the plugin is not authorized, then the system returns to block 608 to get the next plugin from the catalog.

Some embodiments provide approval or authorization mechanisms in addition to, or instead of, the jurisdiction and role based authorization described above. For example, some embodiments verify the content of a plugin to determine whether the plugin has been altered after it was initially installed on a system. Digital signatures, checksums, or other mechanisms may be used to determine whether the plugin has been altered.

A content verification plugin may be used to determine whether a plugin has been altered after its installation on a system. In some embodiments, plugins may be provided by third parties, that is, a party that is different from the party providing the application and framework. In such embodiments, a content verification plugin may be provided by the third party that uses algorithms proprietary to the third party to verify the content of plugins provided by the third party have not been altered. The use of third party plugins and third party content verification plugins provides the ability to extend host application functionality with content provided by third parties in a manner that can assure the third party that their content is valid without requiring disclosure of third party proprietary validation algorithms to the provider of the host application.

Third party plugins may require approval by the provider of a host application prior to being used by the host application. Such approval may be independent of any jurisdictional or role based approval described above. In some embodiments, a host application provider may digitally sign a third party plugin to indicate approval. In such embodiments, a third party plugin is not allowed to register with a host application unless it has been signed by the host application provider.

At block 614, after the plugin has been authorized, the plugin is registered with the application. Registration makes the functionality of the plugin available to the host application through the interface exported by the plugin. In some embodiments, registration of a plugin causes the system to visually expose the plugin by adding the plugin to an available menu or adding an icon associated with the plugin to a graphical user interface for the application. In the case of menus, ordering of menus may be specified within the plugin or within metadata associated with the plugin. The graphical user interface providing the menus or icons may be provided by a plugin.

FIG. 7 is a flowchart illustrating a method 700 for replacing a plugin in a host application. The method begins at block 702 by a host application registering a first set of one or more plugins. The host application may use some or all of method 600 described above to register the first set of plugins.

At block 704, host application 704 determines that a plugin replacement event has occurred. Various plugin replacement events are possible and within the scope of the inventive subject matter. In some embodiments, the replacement event comprises a debug event. In alternative embodiments, the replacement event comprises a new plugin version event.

At block 706, the host application registers the replacement plugin. After such registration, the replacement plugin's interface is used instead of the interface provided by the plugin that is replaced.

In order to illustrate the operation of method 700, several examples will now be provided. A first example will be provided with respect to a debug replacement event. Plugins are typically provided to end users as optimized object code. Optimized object code is code generated by a compiler such that the code runs faster than non-optimized object code. Further, the code is optimized by removing code that may periodically logs the state of the plugin or events that occur within the plugin as an aid to debugging during the development process. Such state information is typically not required during normal operation of the plugin, increases the resource requirements of a plugin, and can slow the operation of the plugin. As a result, such logging code is removed or not generated during the optimization process. A consequence of optimizing object code is that the optimized object code is typically more difficult to debug because the optimized code does provide such logging and because debug information is not present in the optimized object code.

It is sometimes the case that intermittent problems may occur in the optimized plugin that is released to end users that are not found during the development process. In some embodiments, a host application or framework may include a component that monitors for certain conditions that are known or suspected to occur prior to the occurrence of the intermittent problem. Upon the occurrence of such events, the host application or framework replaces the optimized plugin with a debug version of the plugin that provides additional logging or debug information that may be helpful in isolating the intermittent problem. This allows the system to operate in an optimized fashion until a debugging event or events are detected that causes the optimized plugin to be replaced with a debug version of the plugin. In some embodiments, replacement of an optimized plugin with a debug version of the plugin may be performed only if the user has a role authorizing such replacement.

A second example of a replacement event occurs when a new version of a plugin is available. The new version of the plugin may export the same interface methods and data as the prior version of the plugin, or it may export new methods or data in addition to the previously exported methods and data. In general, to maintain backwards compatibility, a new version of a plugin does not remove previously exported methods or data. Upon detection of a new version of a plugin, a host application or framework may replace the old version with the new version.

A third example of a replacement event is a rollback event. It is sometimes the case that it is desirable to revert to a previous version of a plugin. For example, there may be problems with a new version of a plugin that did not exist in the previous version, or the new plugin may be incompatible with other plugins that exist or are later added to the host application. In such cases, a user may indicate that a rollback is to occur. The new plugin is removed and replaced with a previous version of the plugin. Previous versions of a plugin may be stored in plugin repository 204.

In some embodiments, a system checkpoint may be set to reflect a current configuration of plugins. The checkpoint may include a manifest of installed plugins along with the plugin version number in use at the time of the checkpoint. Upon the occurrence of a rollback event, the system uses the checkpoint data to determine the plugins requiring a rollback and which version of a plugin to use for the rollback.

It should be noted that some plugins interact with a database. Certain versions of a plugin may utilize tables, columns or fields to support the operation of the plugin. In order to insure compatibility of the database with the various version of a plugin that may be used, some embodiments do not rollback changes in the database.

A rollback plugin may be used by an AOM application to provide a user interface for selecting a checkpoint or previous plugin version to use for the rollback.

A fourth example of a replacement event is an automatic rollback event. The system or host application may from time to time, detect errors in plugins that have been recently replaced and/or upgraded. In cases where a checkpoint has been performed, the application can automatically apply a "last known good" configuration to restore system functionality. In other cases, the host application can replace a faulty plugin with a debug version in order to aid in diagnostics and troubleshooting. In some embodiments, this process is based on predefined and updatable business logic, wherein the functionality may be subsequently added to a system or upgraded using the same plugin architecture. In further embodiments, continuous monitoring from a host application will ensure that rollback operations are performed when necessary, based on preconfigured or user defined settings.

A fifth example of a replacement event is a theme replacement event. Wagering games and bonus games typically have a theme associated with the wagering game. For example, a wagering game may have theme based on a board game such as Monopoly, a movie such as the Wizard of Oz, a television show such as Star Trek, or other themes. Graphical and audio elements of the wagering game or bonus game such as reel symbols, backgrounds, skins, characters, sounds etc. are designed using the theme. In some embodiments, upon the occurrence of a theme replacement event, a plugin providing graphical and audio elements for a first theme may be replaced by a plugin providing graphical and audio elements for the second theme. A theme replacement event may be conditional on another event. For example, a theme may be replaced if the coin-in for wagering games having the theme falls below a particular threshold.

A sixth example of a replacement event is a rebranding event. In some embodiments, a plugin may provide certain elements that are branded with a logo or other images or sounds associated with a provider of the wagering game or bonus game, a buyer (e.g., casino operator) of the wagering game or bonus game, or a sponsor of the wagering game or bonus game. The branding of elements may be provided by a plugin. Upon determining that a new brand is to be applied to elements, a replacement plugin providing the new branding may be registered to replace a plugin providing the previous branding for a wagering game or bonus game.

Various examples of different types of plugins have been provided above in the discussion of the various embodiments of the inventive subject matter. It should be noted that the scope of the inventive subject matter is not limited to the types of plugins described above. Numerous other plugins are possible and may be used in conjunction with systems and methods described above. Examples of alternative plugins that may be used by a wagering game server, AOM module or wagering game will now be provided.

Expected value plugins may include mathematical algorithms for producing wagering game outcomes that have a particular expected value. The expected value allowed for a particular wagering game may be determined in accordance with regulations for a particular jurisdiction. Thus in some embodiments, multiple expected value plugins may be provided, with a particular expected value plugin chosen in accordance with the jurisdiction where the wagering game is operated.

Similarly, a pay table plugin may be used by a host application that implements a wagering game. Pay table plugins may be selected by a casino that provides different payout characteristics for a wagering game.

A licensing manager plugin may be used to enforce licensing models, with a different plugin used for different licensing models. For example, a first licensing plugin may support a perpetual licensing model, while a second licensing plugin may support a subscription model. The licensing plugins may maintain seat counts, subscription data, and other data needed to enforce the licensing model supported by the licensing manager plugin. Should the licensing model change over time, a new plugin supporting the changed licensing model can be downloaded and instantiated. The licensing manager plugin may be used to enforce licenses for wagering games, bonus games, game themes, or other aspects of a wagering game system that are licensed.

The licensing manager or other plugin may support particular key generation and interpretation algorithms. Should a key generation and interpretation algorithm need to change, (e.g., the algorithm is compromised in some way), a replacement plugin using a new key generation and interpretation algorithm may be provided.

Similarly, plugins that provide key or password encryption/decryption or content validation can be replaced should the encryption/decryption or validation algorithm be compromised.

Peripheral support plugins provide an interface for communicating with peripherals on a wagering game machine, wagering game server or AOM system. A peripheral support plugin may be dedicated to a particular peripheral, type of peripheral, or version of a peripheral. Plugins may be added or removed to reflect the peripherals present on a system.

Protocol support plugins provide interfaces for communicating using particular protocols. The protocols may be industry standard protocols (e.g., TCP/IP) or they may be protocols that are proprietary to a vendor. Multiple protocol support plugins may be present in a host application depending on the number of protocols used by the host application. As protocols change, updated protocol support plugins may be provided to reflect the changed protocol.

A site survey plugin may be provided for an AOM host application that aids in configuring a wagering game system. For example, the site survey plugin may analyze a current configuration for a set of wagering game machines and systems and build customized catalogs of plugins based on the target hardware and systems. The site survey plugin may utilize data obtained from other wagering game environments and compare the target environment with the other environments to determine a desirable configuration for the target hardware or systems. The configuration may be designed to avoid overloading hardware available on the target system, provide wagering games or themes that are expected to be profitable for a casino, or recommend upgrades to current hardware or systems. The site survey plugin may also provide reports on performance of various components of a wagering game system.

The site survey plugin or other plugin or component of an AOM may provide impact reporting regarding changes that may be contemplated or recommended for a wagering game system. The impact reporting may include various aspects of the wagering game system that are affected by the changes. For example, the impact reporting may include various combinations of one or more plugins that are currently installed, requirements for changed or added plugins, adverse impacts of installing a plugin, additional features of the plugin, warnings regarding the backwards compatibility of a new or changed plugin, plugins that are not supported by a proposed licensing model change, or performance predictions based on usage data obtained from other wagering game establishments. The casino operator can then use the impact reporting to determine if installing the new or changed plugin is desirable or not.

Operating Environment

This section describes an example operating environment and presents structural aspects of some embodiments. This section includes discussion about wagering game machine architectures, and wagering game networks.

Wagering Game Machine Architectures

Figure 8:
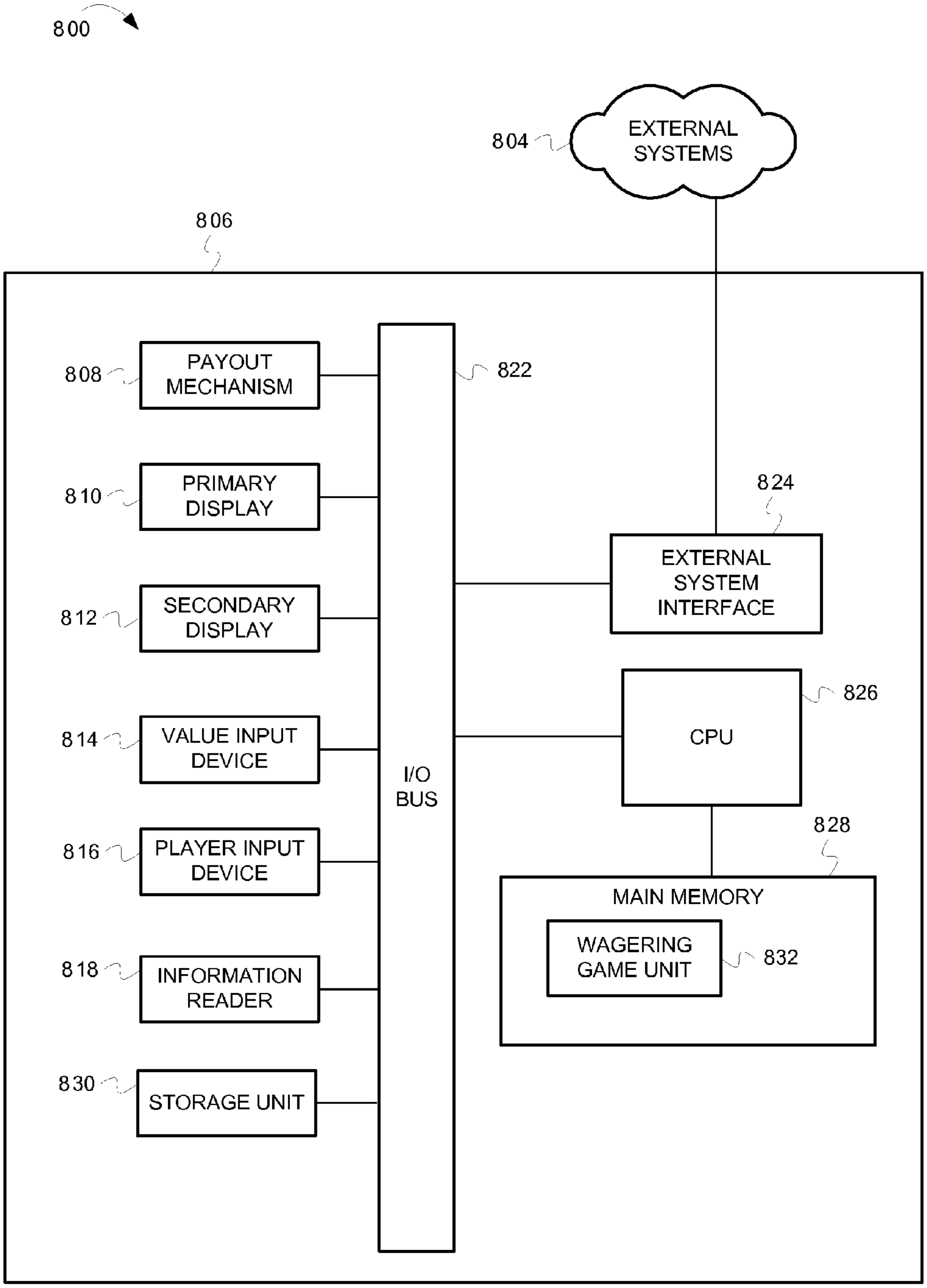
FIG. 8 is a block diagram illustrating an example wagering game machine architecture.

FIG. 8 is a block diagram illustrating a wagering game machine architecture, according to example embodiments of the invention. As shown in FIG. 8, the wagering game machine architecture 800 includes a wagering game machine

806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In one embodiment, the wagering game unit 832 can present wagering games, such as video poker, video black jack, video slots, video lottery, etc., in whole or part.

The CPU 826 is also connected to an input/output (I/O) bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example wagering game machine architecture, this section continues with a discussion wagering game networks.

Wagering Game Networks

Figure 9:
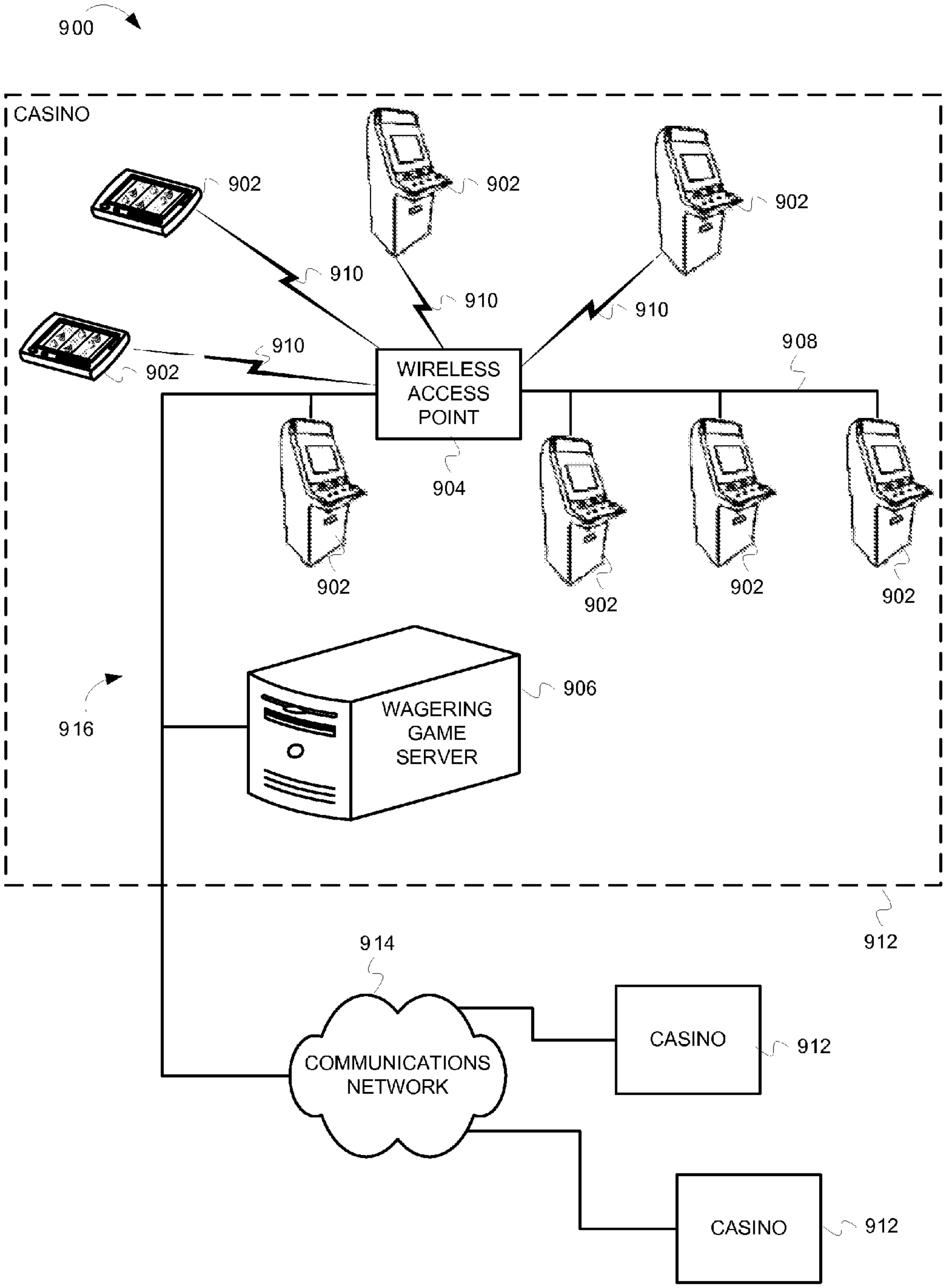
FIG. 9 is a block diagram illustrating a wagering game network.

FIG. 9 is a block diagram illustrating a wagering game network 900, according to example embodiments of the invention. As shown in FIG. 9, the wagering game network 900 includes a plurality of casinos 912 connected to a communications network 914.

Each casino 912 includes a local area network 916, which includes an access point 904, a wagering game server 906, and wagering game machines 902. The access point 9304 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can serve wagering games and distribute content to devices located in other casinos 912 or at other locations on the communications network 914.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

Example Wagering Game Machines

Figure 10:
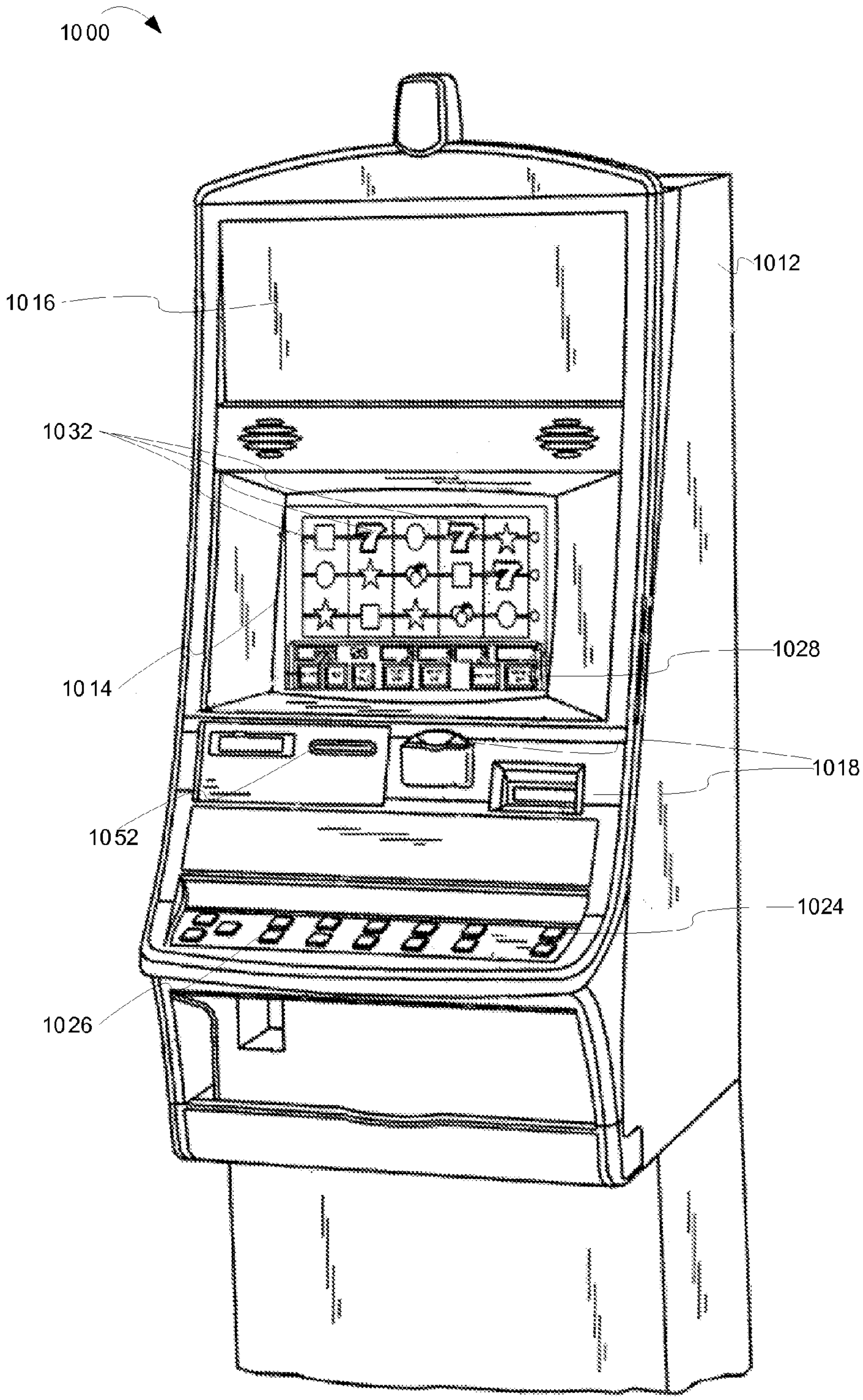
FIG. 10 is a perspective view of a wagering game machine.

FIG. 10 is a perspective view of a wagering game machine, according to example embodiments of the invention. Referring to FIG. 10, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bartop model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

determining a set of plugins associated with a host application;

receiving from a data repository metadata for each plugin in the set of plugins, the metadata including an indicator that jurisdictional approval is required for the plugin and data indicating whether jurisdictional approval has been obtained;

determining by one or more processors a first subset plugins of the set of plugins that have received jurisdictional approval;

determining by the one or more processors, based at least in part on the metadata for each plugin, a second subset of the set of plugins that have not received jurisdictional approval; and submitting the second subset of plugins to a jurisdictional testing agent, wherein the first subset of plugins is not submitted to the jurisdictional testing agent.

2. The method of claim 1, wherein determining a set of plugins that are associated with a host application comprises reading the set of plugins from a catalog associated with the application.

3. The method of claim 1, and further comprising determining that jurisdictional approval is required for the host application in response to detecting an update to a plugin associated with the host application.

4. The method of claim 1, wherein submitting the second subset of plugins to a jurisdictional testing agent includes submitting a change log identifying changes to the second subset of plugins.

5. A method comprising:

initiating by one or more processors execution of a host application of a wagering game system;

receiving by the one or more processors a catalog identifying one or more plugins for the host application;

receiving from a data repository metadata for each plugin in the one or more plugins, the metadata including an indicator that jurisdictional approval is required for the plugin and data indicating whether jurisdictional approval has been obtained;

selecting by the one or more processors a plugin of the one or more plugins;

determining by the one or more processors, based at least in part on the metadata for the plugin, whether the plugin is authorized for a current jurisdiction; and in response to determining that the plugin is authorized for the current jurisdiction, obtaining the plugin and registering the plugin with the application.

6. The method of claim 5, and further comprising:

determining a role associated with a user of the host application; and determining whether the plugin is authorized for the role.

7. The method of claim 5, and further comprising:

upon determining the occurrence of a replacement event during the execution of the host application, replacing a first plugin with a second plugin.

8. The method of claim 7, wherein the replacement event is a debug event and wherein the second plugin comprises a debug version of the first plugin.

9. The method of claim 7, wherein the replacement event is a new version event and wherein the second plugin comprises a newer version of the first plugin.

10. A wagering game system comprising:

a repository maintaining a plurality of plugins; and a jurisdictional approval module executable by one or more processors communicably coupled to the repository and configured to:

determine a set of plugins of the plurality of plugins that are associated with a host application;

receive from the repository metadata for each plugin in the set of plugins, the metadata including an indicator that jurisdictional approval is required for the plugin and data indicating whether jurisdictional approval has been obtained;

determine a first subset plugins of the set of plugins that have received jurisdictional approval;

determine, based at least in part on the metadata for each plugin, a second subset of the set of plugins that have not received jurisdictional approval;

submit the second subset of plugins to a jurisdictional testing agent, wherein the first subset of plugins is not submitted to the jurisdictional testing agent.

11. The wagering game system of claim 10, wherein the jurisdictional approval module is further configured to read the set of plugins from a catalog associated with the application.

12. The wagering game system of claim 10, wherein the jurisdictional approval module is further configured to determine that jurisdictional approval is required for the host application in response to detecting an update to a plugin associated with the host application.

13. The wagering game system of claim 10, wherein the jurisdictional approval module is further configured to submit a change log identifying changes to the second subset of plugins.

14. One or more non-transitory computer-readable media having stored thereon computer executable instructions for causing one or more processors to perform operations comprising:

determining a set of plugins that are associated with a host application;

receiving from a data repository metadata for each plugin in the set of plugins, the metadata including an indicator that jurisdictional approval is required for the plugin and data indicating whether jurisdictional approval has been obtained;

determining a first subset plugins of the set of plugins that have received jurisdictional approval;

determining, based at least in part on the metadata, a second subset of the set of plugins that have not received jurisdictional approval; and submitting the second subset of plugins to a jurisdictional testing agent, wherein the first subset of plugins is not submitted to the jurisdictional testing agent.

15. The one or more non-transitory computer-readable media of claim 14, wherein determining a set of plugins that are associated with a host application comprises reading the set of plugins from a catalog associated with the application.

16. The one or more non-transitory computer-readable media of claim 14, wherein the operations further comprise determining that jurisdictional approval is required for the host application in response to detecting an update to a plugin associated with the host application.

17. The one or more non-transitory computer-readable media of claim 14, wherein submitting the second subset of plugins to a jurisdictional testing agent includes submitting a change log identifying changes to the second subset of plugins.

18. One or more non-transitory computer-readable media having stored thereon computer executable instructions for causing one or more processors to perform operations comprising:

initiating execution of a host application of a wagering game system;

receiving a catalog identifying one or more plugins for the host application;

receiving from a data repository metadata for each plugin in the one or more plugins, the metadata including an indicator that jurisdictional approval is required for the plugin and data indicating whether jurisdictional approval has been obtained;

selecting a plugin of the one or more plugins;

determining, based at least in part on the metadata for the plugin, whether the plugin is authorized for a current jurisdiction; and in response to determining that the plugin is authorized for the current jurisdiction, obtaining the plugin and registering the plugin with the application.

19. The one or more non-transitory computer-readable media of claim 18, wherein the operations further comprise:

determining a role associated with a user of the host application; and determining whether the plugin is authorized for the role.

20. The one or more non-transitory computer-readable media of claim 18, wherein the operations further comprise:

upon determining the occurrence of a replacement event during the execution of the host application, replacing a first plugin with a second plugin.

21. The one or more non-transitory computer-readable media of claim 20, wherein the replacement event is a debug event and wherein the second plugin comprises a debug version of the first plugin.

22. The one or more non-transitory computer-readable media of claim 20, wherein the replacement event is a new version event and wherein the second plugin comprises a newer version of the first plugin.

23. A system comprising means for determining a set of plugins that are associated with a host application;

means for receiving metadata for each plugin in the set of plugins, the metadata including an indicator that jurisdictional approval is required for the plugin and data indicating whether jurisdictional approval has been obtained;

means for determining a first subset plugins of the set of plugins that have received jurisdictional approval;

means for determining, based at least in part on the metadata for each plugin, a second subset of the set of plugins that have not received jurisdictional approval; and means for submitting the second subset of plugins to a jurisdictional testing agent, wherein the first subset of plugins is not submitted to the jurisdictional testing agent.

24. The system of claim 23, wherein determining a set of plugins that are associated with a host application comprises reading the set of plugins from a catalog associated with the application.

25. The system of claim 23, and further comprising means for determining that jurisdictional approval is required for the host application in response to detecting an update to a plugin associated with the host application.

* * * * *